(12) United States Patent
Lu

(10) Patent No.: US 6,869,527 B2
(45) Date of Patent: Mar. 22, 2005

(54) FILTER FACILITY HAVING FLOW FACILITATING STRUCTURE

(76) Inventor: Kuen Hsien Lu, P.O. Box 63-298, Taichung (TW), 406

( * ) Notice: Subject to any disclaimer, the term of this patent is extended or adjusted under 35 U.S.C. 154(b) by 0 days.

(21) Appl. No.: 10/600,979

(22) Filed: Jun. 17, 2003

(65) Prior Publication Data

US 2004/0256305 A1 Dec. 23, 2004

(51) Int. Cl.⁷ .............................................. B01D 27/00
(52) U.S. Cl. ................... 210/168; 210/188; 210/416.5; 210/512.1; 210/416.4; 210/419; 210/420; 55/337
(58) Field of Search ................................. 210/168, 188, 210/416.4, 416.5, 512.1, 419, 420; 55/337

(56) References Cited

U.S. PATENT DOCUMENTS

| | | | | |
|---|---|---|---|---|
| 4,783,271 A | * | 11/1988 | Silverwater | 210/742 |
| 4,865,632 A | * | 9/1989 | Yano et al. | 96/212 |
| 5,066,391 A | * | 11/1991 | Faria | 210/85 |
| 5,209,842 A | * | 5/1993 | Moor | 210/168 |
| 5,225,081 A | * | 7/1993 | Brownawell | 210/690 |
| 5,500,093 A | * | 3/1996 | Marsden | 196/46 |
| 6,296,765 B1 | * | 10/2001 | Brown et al. | 210/380.1 |
| 6,464,863 B1 | * | 10/2002 | Nguyen | 210/168 |

\* cited by examiner

Primary Examiner—Minh-Chau T. Pham
(74) Attorney, Agent, or Firm—Charles E. Baxley

(57) ABSTRACT

A filter facility includes a filter device received in a container and having a housing for receiving a number of filter particles. The housing includes a peripheral partition extended into the chamber from a bottom panel, and a plate disposed on top of the peripheral partition to form a compartment within the peripheral partition and the plate, and to form a peripheral space between the peripheral partition and a peripheral wall of the housing. The housing includes a number of apertures formed in the peripheral wall and the peripheral partition and the plate to increase a flowing area of the fluid through the housing.

4 Claims, 2 Drawing Sheets

FILTER FACILITY HAVING FLOW FACILITATING STRUCTURE

BACKGROUND OF THE INVENTION

1. Field of the Invention

The present invention relates to a filter facility, and more particularly to a filter facility having a structure for allowing fluid to be effectively flown through the filter facility, and for increasing working life of the filter facility.

2. Description of the Prior Art

Typical air conditioning systems or facilities comprise a tube system for receiving fluid therein, such as coolant or cooling agent therein, a compressor for pumping the fluid through the tube system, and one or more filter facilities coupled in the tube system, to receive and to filter the fluid.

Normally, the typical filter facilities comprise one or more filter clothes or screens disposed in a container or the like, to filter the fluid.

However, particles or dirt contained in the fluid may be filtered and retained in the clothes or screens of the filter facilities, and may easily or quickly block the clothes or screens of the filter facilities. The fluid may not effectively flow through the clothes or screens of the filter facilities when the clothes or screens of the filter facilities have been blocked by the particles or dirt.

In addition, when the clothes or screens of the filter facilities have been blocked by the particles or dirt, the flowing speed and flowing quantity of the fluid through the tube system and/or the compressor may be decreased, and may thus damage the whole air conditioning systems or facilities.

The present invention has arisen to mitigate and/or obviate the afore-described disadvantages of the conventional filter facilities.

SUMMARY OF THE INVENTION

The primary objective of the present invention is to provide a filter facility including a structure for allowing the fluid to be effectively flown through the filter facility, and for increasing the working life of the filter facility.

In accordance with one aspect of the invention, there is provided a filter facility comprising a container including a chamber formed therein to receive a fluid, a filter device received in the chamber of the container, to separate the chamber of the container into a first space and a second space, the container including an inlet communicating with the first space of the container, to allow the fluid to flow into the first space of the container and then to flow through the filter device, and the container including an outlet communicating with the second space of the container, to allow the fluid flowing through the filter device to flow out through the second space and the outlet of the container, the filter device including a housing having a bottom panel received in the chamber of the container, and having an outer peripheral wall extended upwardly from the bottom panel, to form a chamber in the housing, and a plurality of filter particles received within the chamber of the housing, for filtering the fluid. The housing includes a peripheral partition extended upwardly from the bottom panel thereof, and extended into the chamber of the housing, and includes a plate provided on top of the peripheral partition, to form a compartment within the peripheral partition and the plate, and to form a peripheral space between the peripheral partition and the peripheral wall of the housing. The housing includes a plurality of apertures formed in the peripheral wall and the peripheral partition and the plate, and communicating with the chamber and the compartment and the peripheral space of the housing, to increase a flowing area of the fluid through the housing.

The filter device further includes a filter member disposed below the bottom panel, and disposed between the housing and the second space of the container, to filter the fluid. The filter device further includes a casing disposed below the filter member, and disposed between the filter member and the second space of the container, the casing includes a plurality of orifices formed therein to allow the fluid to flow through the filter member and the orifices of the container. The casing includes an outer peripheral fence extended upwardly therefrom to form a space therein, and to receive the filter member in the space of the casing.

The container includes a reduced base provided in bottom thereof, to form an inner peripheral shoulder therein, and to seat and retain the filter device within the chamber of the container.

The filter device further includes another filter member disposed on the filter particles, to filter the fluid before the fluid flowing through the filter particles. The filter device further includes a filter screen disposed on the other filter member, to filter the fluid before the fluid flowing through the other filter member.

A spring biasing device may further be provided for biasing the filter screen against the filter member and the filter particles. The filter screen includes an outer peripheral flange extended therefrom and slidably engage with the peripheral wall of the housing, to guide the filter screen to move up and down relative to the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
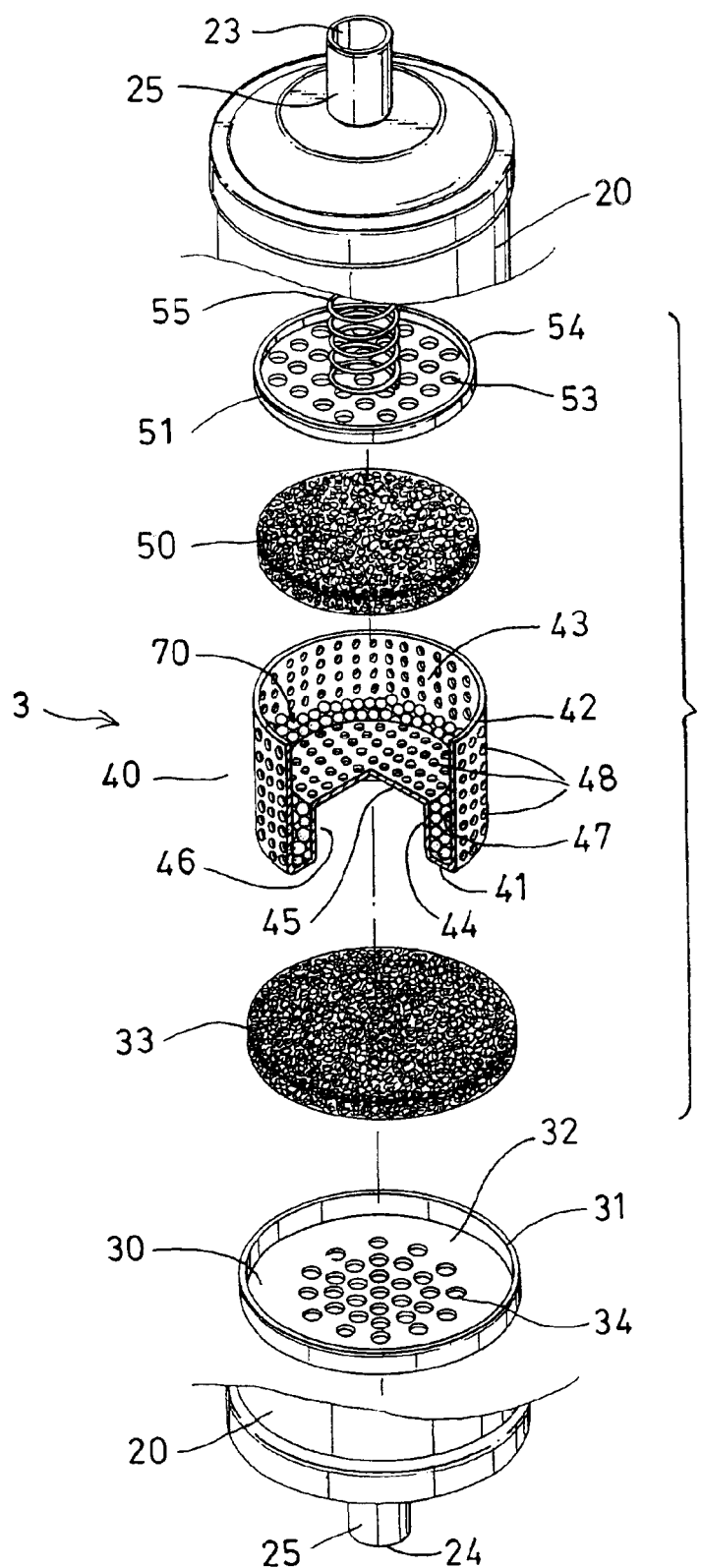
FIG. 1 is an exploded view of a filter facility in accordance with the present invention.
Figures 2, 3:
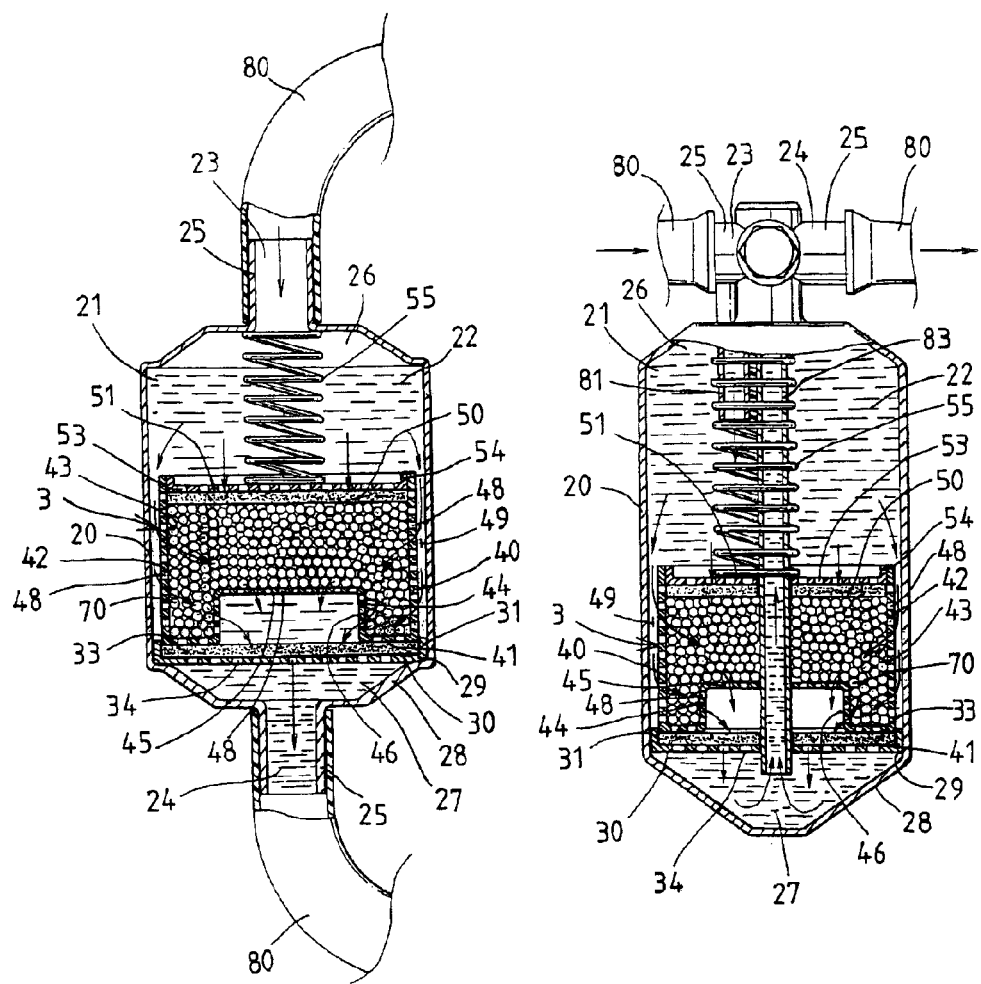
FIG. 2 is a cross sectional view of the filter facility, illustrating the operation of the filter facility.
FIG. 3 is a cross sectional view similar to FIG. 2, illustrating the other arrangement of the filter facility.

Referring to the drawings, and initially to FIGS. 1 and 2, a filter facility in accordance with the present invention comprises a container 20 including a chamber 21 formed therein for receiving a fluid 22, such as a coolant or cooling agent 22 (FIGS. 2, 3), and including an inlet 23 and an outlet 24 formed therein and each defined by a conduit 25, and communicating with the chamber 21 of the container 20 for allowing the fluid 22 to flow into and to flow out the chamber 21 of the container 20.

A filter device 3 is to be disposed in the container 20, such as disposed in the middle portion of the container 20, in order to separate the chamber 21 of the container 20 into two spaced spaces 26, 27 which are communicating with the inlet 23 and the outlet 24 of the container 20 respectively, for allowing the fluid 22 to flow from the inlet 23 and the space 26 of the container 20, and to flow through the filter device 3, and then to flow out through the space 27 and the outlet 24 of the container 20.

The container 20 preferably includes a frustum-shaped or reduced base 28 formed or provided in the bottom portion thereof, to form or define an inner peripheral shoulder 29 therein, and to seat or support or retain the filter device 3 within the container 20. The conduits 25 of the container 20 may be connected to hoses 80 for allowing the fluid 22 to flow through the filter facility through or via the hoses 80.

The filter device 3 includes a casing 30 rested or seated or secured on the inner peripheral shoulder 29 of the container 20, and having a peripheral fence 31 extended upwardly from the outer peripheral portion thereof, to form or define a space 32 therein, and to receive a filter cloth or member 33 in the space 32 of the casing 30. The casing 30 includes a number of orifices 34 formed therein and communicating with the space 32 thereof, for allowing the fluid 22 to flow through the filter member 33 and the orifices 24 of the container 20.

A housing 40 includes a bottom panel 41 received in the chamber 21 of the container 20, and engaged or seated on the filter member 33, a peripheral wall 42 extended upwardly from the outer peripheral portion thereof, to form or define a chamber 43 therein, and to receive a number of filter particles 70 within the chamber 43 of the housing 40. The filter member 33 is thus disposed between the housing 40 and the space 27 of the container 20.

The housing 40 includes a peripheral partition 44 extended upwardly from the bottom panel 41 thereof, and extended into the chamber 43 of the housing 40, and includes a plate 45 provided on top of the peripheral partition 44, to form or define a compartment 46 within the peripheral partition 44 and the plate 45, and to form or define a peripheral space 47 between the peripheral partition 44 and the peripheral wall 42 of the housing 40.

The housing 40 includes a number of apertures 48 formed in the peripheral wall 42 and/or the bottom panel 41 and/or the peripheral partition 44 and/or the plate 45, and communicating with the chamber 43 and/or the compartment 46 and/or the peripheral space 47 of the housing 40, for allowing the fluid 22 to flow through the peripheral wall 42 and/or the bottom panel 41 and/or the peripheral partition 44 and/or the plate 45 of the housing 40.

As best shown in FIGS. 2 and 3, the peripheral wall 42 of the housing 40 is engaged in the peripheral fence 31 of the casing 30, such that a peripheral channel 49 may be formed or defined between the peripheral wall 42 of the housing 40 and the container 20, for allowing the fluid 22 to flow through the peripheral wall 42 and then flow into the chamber 43 of the housing 40.

Another filter cloth or member 50 may further be provided and received within the chamber 43 of the housing 40, and disposed or engaged on top of the filter particles 70, to further filter the fluid 22 before the fluid 22 flows through the filter particles 70. A filter screen 51 may further be provided and received within the chamber 43 of the housing 40, and disposed or engaged on top of the filter cloth or member 50, to further filter the fluid 22. A spring member 55 may further be provided and engaged between the container 20 and the filter screen 51, to bias the filter screen 51 and the filter cloth or member 50 against the filter particles 70.

The filter screen 51 may include a number of holes 53 formed therein to allow the fluid 22 to flow through the screen 51. The screen 51 may further include a peripheral flange 54 extended upwardly from the outer peripheral portion thereof, to engage with the peripheral wall 42 of the housing 40, and to guide the screen 51 to smoothly move up and down relative to the housing 40.

In operation, as shown in FIG. 2, the fluid 22 from the hose 80 and the inlet 23 of the container 20 may flow through the filter particles 70 via either the screen 51 and the filter cloth or member 50, or the peripheral wall 42 of the housing 40; and may then flow through the bottom panel 41 or the peripheral partition 44 or the plate 45 before flowing through the filter cloth or member 33 and the casing 30 of the filter device 3.

It is to be noted that the formation or the provision of the peripheral partition 44 and the plate 45 within the chamber 43 of the housing 40 may increase the contact areas between the housing 40 and the filter particles 70, or may increase the flowing areas of the fluid 22 through the housing 40.

Referring next to FIG. 3, the inlet 23 and the outlet 24 of the container 20 may also be simultaneously provided on top of the container 20, and the container 20 may include a pipe 81 coupled to the inlet 23 of the container 20 and engaged into the space 26 of the container 20, and may include another pipe 83 coupled to the outlet 24 of the container 20 and engaged through the filter device 3 and engaged into the other space 27 of the container 20.

Accordingly, the filter facility in accordance with the present invention includes a structure for allowing the fluid to be effectively flown through the filter facility, and for increasing the working life of the filter facility.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A filter facility comprising:
   a container including a chamber formed therein to receive a fluid,
   a filter device received in said chamber of said container, to separate said chamber of said container into a first space and a second space,
   said container including an inlet communicating with said first space of said container, to allow the fluid to flow into said first space of said container and then to flow through said filter device, and said container including an outlet communicating with said second space of said container, to allow the fluid flowing through said filter device to flow out through said second space and said outlet of said container,
   said filter device including a housing having a bottom panel received in said chamber of said container, and having an outer peripheral wall extended upwardly from said bottom panel, to form a chamber in said housing,
   a plurality of filter particles received within said chamber of said housing, for filtering the fluid,
   a first filter member disposed below said bottom panel of said housing, and disposed between said housing and said second space of said container, to filter the fluid,
   a casing disposed below said first filter member, and disposed between said first filter member and said second space of said container, said casing including a plurality of orifices formed therein to allow the fluid to flow through said first filter member and said orifices of said container,
   a second filter member disposed on said filter particles, to filter the fluid before the fluid flowing through said filter particles, a filter screen disposed on said second filter member, to filter the fluid before the fluid flowing through said second filter member, and means for biasing said filter screen against said second filter member and said filter particles, said housing including a peripheral partition extended upwardly from said bottom panel thereof, and extended into said chamber of said housing, and including a plate provided on top of said peripheral partition, to form a compartment within said peripheral partition and said plate, and to form a peripheral space between said peripheral partition and said peripheral wall of said housing, and said housing including a plurality of apertures formed in said peripheral wall and said peripheral partition and said plate, and communicating with said chamber and said compartment and said peripheral space of said housing, to increase a flowing area of the fluid through said housing.

2. The filter facility as claimed in claim 1, wherein said casing includes an outer peripheral fence extended upwardly therefrom to form a space therein, and to receive said first filter member in said space of said casing.

3. The filter facility as claimed in claim 1, wherein said container includes a reduced base provided in bottom thereof, to form an inner peripheral shoulder therein, and to seat and retain said filter device within said chamber of said container.

4. The filter facility as claimed in claim 1, wherein said filter screen includes an outer peripheral flange extended therefrom and slidably engage with said peripheral wall of said housing, to guide said filter screen to move up and down relative to said housing.

* * * * *